United States Patent [19]

Crouch

[11] Patent Number: 4,987,974

[45] Date of Patent: Jan. 29, 1991

[54] DEVICE TO ASSIST WITH THE RADIAL DISTRIBUTION OF LUBRICATING FLUID FROM A ROTATING SHAFT

[75] Inventor: Donald G. Crouch, Royal Oak, Mich.

[73] Assignee: Saturn Corporation, Troy, Mich.

[21] Appl. No.: 448,472

[22] Filed: Dec. 11, 1989

[51] Int. Cl.$^5$ .............................................. F16C 3/14
[52] U.S. Cl. .................................. 184/6.12; 184/11.1; 464/7
[58] Field of Search ..................... 184/6.12, 11.1, 11.2, 184/11.3; 74/467; 475/159; 464/7, 183

[56] References Cited

U.S. PATENT DOCUMENTS

| | | | |
|---|---|---|---|
| 2,165,448 | 7/1939 | Browne ............................... | 464/183 |
| 3,380,555 | 4/1968 | Myers et al. ......................... | 184/6.12 |
| 3,637,049 | 1/1972 | Butterfield et al. .................. | 184/6.12 |
| 3,785,458 | 1/1974 | Caldwell et al. ..................... | 184/6.12 |
| 4,442,729 | 4/1984 | Hayakawa ........................... | 184/6.12 |

FOREIGN PATENT DOCUMENTS 2757570 6/1979 Fed. Rep. of Germany .......... 464/7

Primary Examiner—Ira S. Lazarus
Assistant Examiner—Alan B. Cariaso
Attorney, Agent, or Firm—Donald F. Scherer

[57] ABSTRACT

A device for assisting with the radial distribution of a fluid from a rotating shaft having an axially oriented feed passage opening through an entry, end portion of the shaft and a plurality of discharge ports ($P_1$–$P_4$) spaced axially, and circumferentially, about the shaft to effect communication between the feed passage and the exterior of the shaft. The device is insertably received within the entry end portion of the feed passage. A plug portion is provided to retain flange by being utilized to determine the extend to which the plug portion may be insertably received within the feed passage. An annular constriction is presented from the device, and the constriction is adapted to be located interiorly of, and axially inwardly from, the entry end portion of the feed passage. A flared portion tapers conically outwardly from the constriction and extends inwardly along the feed passage for a predetermined distance to underlie selected discharge ports ($P_3$–$P_4$). The flared portion extends from the constriction to a terminal end portion. A spacer flange extends radially outwardly from the terminal end portion to engage the interior wall of the feed passage. The spacer flange is circumferentially discontinuous to provide at least one back-flow aperture along the exterior of the terminal end portion.

11 Claims, 3 Drawing Sheets

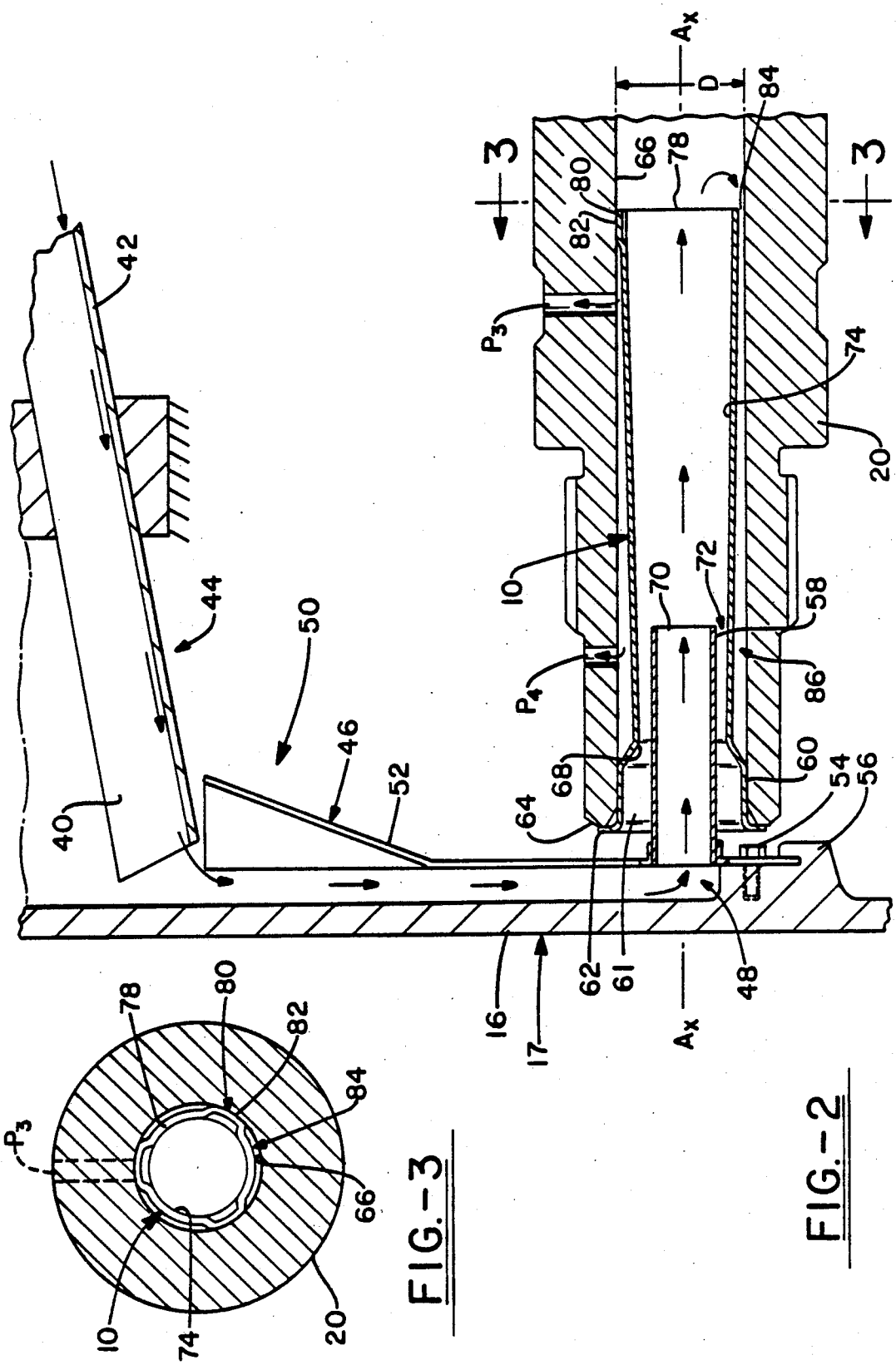

DEVICE TO ASSIST WITH THE RADIAL DISTRIBUTION OF LUBRICATING FLUID FROM A ROTATING SHAFT

TECHNICAL FIELD

The present invention relates generally to lubricating systems and devices. More particularly, the present invention relates to the distribution of lubricating fluid along a feed passage—in the nature of a blind bore which extends axially within a rotating shaft—and then outwardly from the feed passage through a plurality of radially oriented discharge ports which communicate between the feed passage and the exterior of the shaft. Specifically, the present invention relates to a device which is insertably received, and secured, within the open, entry end of an axially oriented, blind bore that serves as a feed passage within a rotating shaft to effect distribution of lubricating fluid in comparable quantities outwardly through a plurality of axially spaced, radially oriented, discharge ports which communicate between the feed passage and the exterior of the shaft.

BACKGROUND OF THE INVENTION

The radial distribution of lubricating fluids from a rotating shaft is basically well known to the prior art. Typically, a rotating shaft may have a feed passage which extends axially within the rotating shaft. One or more radially oriented discharge ports communicate between the axially oriented feed passage and the exterior of the shaft. Rotation of the shaft ejects lubricating fluid, from that present within the axially oriented feed passage, radially outwardly through the discharge ports to at least some extent by centrifugal action. Such distribution systems for lubricating fluid have been widely employed in the automotive industry to effect lubrication of bearings, gears and other relatively moving elements. Radial distribution of lubricating fluid has, perhaps, been most frequently adopted for use in conjunction with vehicular transmissions.

U.S. Pat. No. 4,442,729 to Hayakawa, issued Apr. 17, 1984, discloses a structure which exemplifies the radial distribution of lubricating fluid from a rotating shaft according to the prior art. As is customary with such prior art distributing systems, this patent discloses the use of an axial feed passage within a rotating shaft. A plurality of radially oriented discharge ports effect communication between the feed passage and the exterior of the rotating shaft. This prior art patent discloses a pressurized feed system. That is, lubricating fluid is pumped, under pressure, into the feed passage, and as the shaft rotates the lubricating fluid is distributed outwardly through the radially oriented discharge ports to lubricate various elements of a four-wheel drive, torque transfer mechanism.

U.S. Pat. No. 4,644,815 to Nagoyo et al., issued Feb. 24, 1987, on the other hand, discloses the use of a gravity system to supply lubricating fluid to the feed passage. The gravity supply system includes an oil collecting assembly mounted above the rotating shaft which has the axial feed passage therein. The lubricating fluid splashes against the collecting assembly and is directed to the entrance of the feed passage within the shaft. Specifically, a conduit directs the lubricating fluid from the collecting assembly to an impeller in the open end of the feed passage. The impeller causes the lubricating fluid to flow toward the closed, or downstream, end of the feed passage. Rotation of the shaft effects radial distribution of the lubricating fluid outwardly through a plurality of axially spaced, radially disposed, discharge ports.

U.S. Pat. No. 4,222,283 to Nagy, issued Sept. 16, 1980, also discloses a gravity system for supplying lubricating fluid to the axial feed passage within the rotating shaft of a radial distribution system for lubricating fluids. Here, too, the lubricating fluid is splashed against a collecting assembly positioned above the rotating shaft within which the feed passage extends. The collection system disclosed in this prior art patent works exceptionally well, and such a system can well be employed in conjunction with the present invention. In any event, the lubricating fluid so collected is then fed, via gravity, past a sleeve and retaining shield mounted adjacent to the open, or upstream, entry end of the feed passage within the rotating shaft in order for the lubricating fluid to gain admission to the feed passage. The sleeve and retaining shield permit lubricating fluid to flow into the feed passage during rotation of the shaft, but the sleeve and retaining shield also attempt to retain a portion of the lubricating fluid within the feed passage at shutdown in order to provide some lubricating fluid for radial delivery immediately upon start-up. The effectiveness of this attempt will, of course, depend at least in part on the disposition of the discharge ports when the shaft stops rotating.

It has been found that systems for radially distributing lubricating fluid by rotation of a shaft work quite well when there are a limited number of axially spaced discharge ports. In this regard it should be understood that rotation of the shaft acts upon the lubricating fluid as soon as it enters the feed passage. For that reason the major portion of the lubricating fluid is emitted from the discharge ports located in closest proximity to the locus at which the lubricating fluid is admitted to the feed passage. Accordingly, when a plurality of discharge ports are spaced axially along the feed passage—and particularly when a gravity feed system is employed—comparable quantities of lubricating fluid are not necessarily emitted from each discharge port. The greatest quantity of lubricating fluid is generally emitted from that discharge port located in closest proximity to the locus at which the lubricating fluid is admitted, with progressively lesser quantities being emitted from the successively more remote discharge ports. Some attempts have been made to vary the size of the individual discharge ports in order to achieve the emission of comparable quantities of lubricating fluid from the successively more remote discharge ports, but such an approach is effective only with respect to any shaft which is rotated at a fairly constant speed. The prior art is, therefore, devoid of structures which are capable of assuring the delivery of comparable quantities of lubricating fluid through a plurality of axially spaced, discharge ports, and particularly so when the shaft is subjected to rotation at varying speeds as well as when a gravity system is employed to deliver lubricating fluid to the feed passage.

SUMMARY OF THE INVENTION

It is, therefore, a primary object of the present invention to provide a device which will effect distribution of lubricating fluid in comparable quantities through a plurality of discharge ports that are axially spaced along a rotating shaft.

It is another object of the present invention to provide a device, as above, which will function equally as well with a gravity system for supplying lubricating fluid to the rotating shaft as with a pressurized system for supplying lubricating fluid.

It is a further object of the present invention to provide a device, as above, which will function to effect the emission of comparable quantities of lubricating fluid through each of a plurality of axially spaced, discharge ports, irrespective of the rotational speed of the shaft from which the lubricating fluid is emitted.

It is still another object of the present invention to provide a device, as above, which may, with relatively minimal difficulty, be capable of being retro-fitted into existing radial discharge systems for distributing lubricating fluid.

It is yet another object of the present invention to provide a device, as above, which is relatively uncomplicated and which is relatively inexpensive to manufacture, maintain and/or retro-fit.

It is a still further object of the present invention to provide a device, as above, which has particular applicability for use in conjunction with vehicular transmissions.

These and other objects of the invention, as well as the advantages thereof over existing and prior art forms, which will be apparent in view of the following detailed specification, are accomplished by means hereinafter described and claimed.

In general, a device for assisting with the radial distribution of fluid from a rotating shaft, and embodying the concepts of the present invention, is adapted for use in conjunction with a rotating shaft having an axially oriented, blind bore opening through one end of the shaft. The device is insertably received within the open end of the blind bore, and means are provided to retain the device therein. The device presents an annular constriction, and the constriction is adapted to be located interiorly of the axially oriented blind bore. A flared portion tapers conically outwardly from the constriction and extends inwardly along the blind bore for a predetermined distance to a terminal end portion. The distance which the flared portion extends inwardly along the blind bore is largely determined by the number of discharge ports it is intended to underlie in order to effect the emission of comparable quantities of fluid through the discharge ports.

A spacer flange extends radially outwardly from the terminal end portion to engage the interior wall of the axially oriented blind bore. The spacer flange is circumferentially discontinuous to provide at least one backflow aperture along the exterior of the terminal end portion.

The present invention is described in conjunction with one exemplary embodiment of a device embodying the concepts thereof, together with two variations for the terminal end portion of the device, and that description is deemed sufficient to effect a full disclosure of the subject invention. The device is described in detail in conjunction with a representative environment without attempting to show all of the various forms and modifications in which the invention might be embodied; the invention being measured by the appended claims and not by the details of the specification.

BRIEF DESCRIPTION OF THE DRAWINGS

FIG. 2 is an enlarged portion of FIG. 1 in order to focus more particularly on the representative device to which the present invention is directed.

FIG. 3 is a transverse sectional view taken substantially along line 3—3 of FIG. 2.

DESCRIPTION OF AN EXEMPLARY EMBODIMENT

Figure 1:
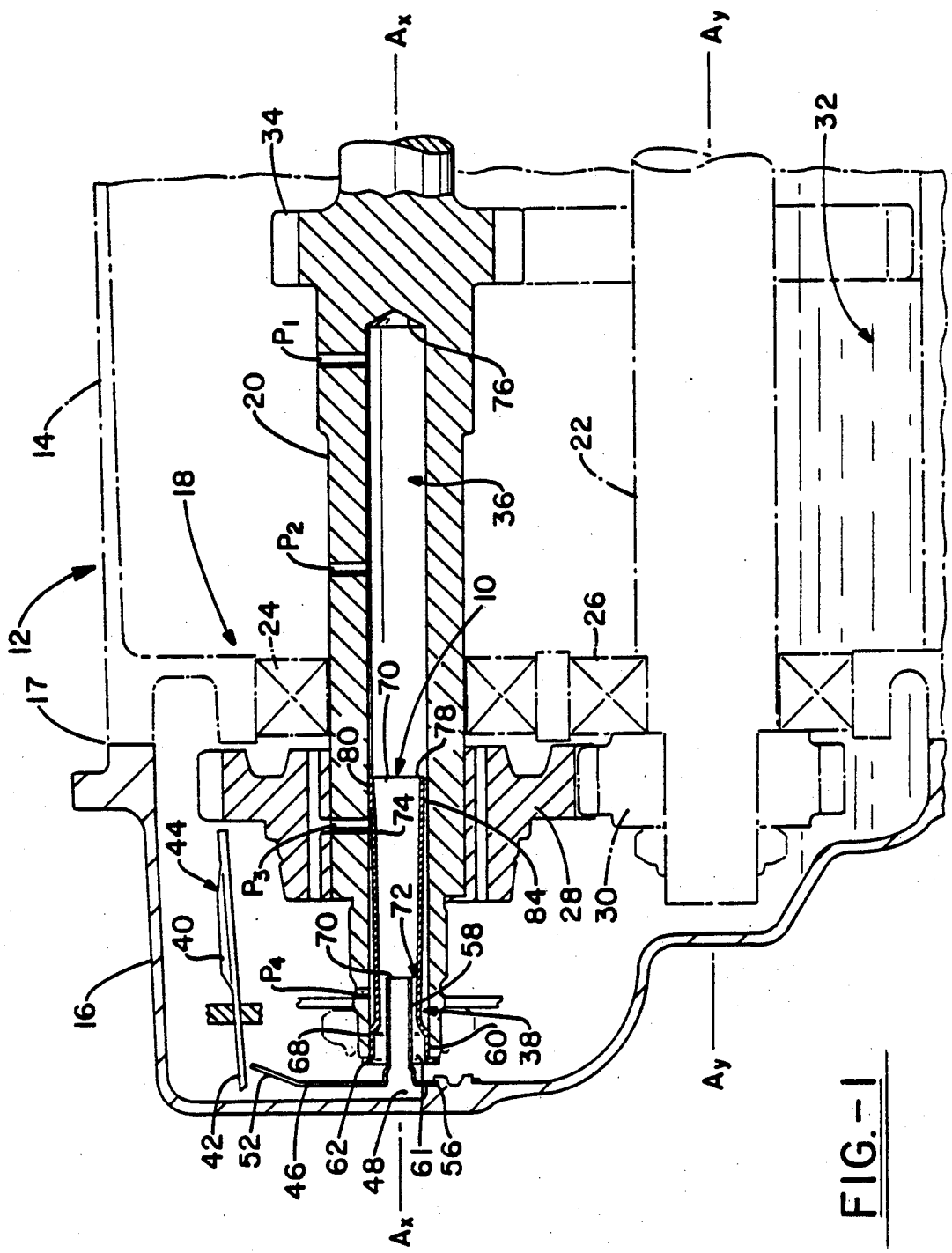
FIG. 1 is a cross-sectional view of a portion of a vehicular transmission which incorporates a device embodying the concepts of the present invention to assist with the radial distribution of lubricating fluid from a rotating shaft.

One representative form of a device employed to accomplish the objects of the present invention is designated generally by the numeral 10 on the accompanying drawings. With particular reference to FIG. 1, the representative device 10 is depicted in conjunction with a vehicular transmission, a portion of which is designated generally by the numeral 12. As depicted, the vehicular transmission 12 includes a casing 14 and a cover 16 which may be bolted, or otherwise secured, to the casing 14 to form an enclosure 17 which houses the mechanism 18 of the transmission 12. While the mechanism 18 of a complete transmission 12 includes numerous gears, shafts and shifting elements, for the sake of simplicity only those elements required to provide an understanding of the present invention are illustrated in solid line. Any elements shown in phantom, or chain line, are for the purpose of representing the overall environment of a vehicular transmission 12 and should not be construed as being necessary to the operation of the invention. Also, the invention is shown as it may be applied to a vehicular transmission 12 comprised of parallel, rotating input and output shafts 20 and 22, respectively. However, the invention may as well be applied to any mechanism having at least one rotating shaft wherein the shaft may be utilized for the radial distribution of lubricating fluid.

One end portion of the input shaft 20 may be rotatably supported in a bearing 24 for rotation of the shaft 20 about its own axis. The rotational axis of shaft 20 is designated as $A_x$—$A_x$ in FIGS. 1 and 2. The output shaft 22 may also be rotatably supported in a bearing 26 for rotation of that shaft about its own axis. The rotational axis of shaft 22 is parallel to the axis $A_x$—$A_x$ of shaft 20 and is designated as $A_y$—$A_y$ in FIG. 1. Additional bearings (not shown) are also employed in conjunction with the shafts 20 and 22 in order to stabilize their disposition, but those details are not important to an understanding of the present invention.

Typically, the input shaft 20 would drive the output shaft 22, as by the selective interaction of gears 28 and 30 operatively secured to the respective shafts 20 and 22. A lubricating fluid 32 is provided within the enclosure 17 formed by the casing 14 and the cover 16, and that fluid 32 may be distributed from the bottom to the top of the enclosure 17 by the splashing action effected as a result of the rotation of the working components in the mechanism 18 of the transmission 12, including the gears 28 and 30. Obviously, additional, selectively interacting gears, such as gear 34 on shaft 20, may be positioned along the lengths of the shafts 20 and 22, and these would likewise contribute, in a conventional and well-known manner, to the splashing of the lubricating fluid 32 within the enclosure 17.

The shaft 20 is provided with a blind bore 36 which extends axially into the shaft 20 and constitutes the hereinafter described feed passage which shall hereinafter also be identified by the numeral 36. A plurality of radially oriented discharge ports are located at various longitudinal and circumferential positions along the length of the feed passage 36. FOUR such discharge ports are depicted and represented by the designations $P_1$, $P_2$, $P_3$ and $P_4$ in FIG. 1. Lubricating fluid 32 admitted into the entry, or upstream, end portion 38 of the feed passage 36 will flow therealong, but rotation of the shaft 20 assures that the lubricating fluid 32 within the feed passage 36 will be emitted radially outwardly through the discharge ports $P_1$ through $P_4$ by centrifugal action. As such, lubricating fluid 32 will be continuously emitted during each revolution of the shaft 20. The foregoing description defines the structure by which the prior art would attempt to lubricate the various working elements of a transmission. In such prior art arrangements the greatest quantity of lubricating fluid would have been emitted from that discharge port $P_4$ disposed in closest proximity to the location at which the lubricating fluid was admitted into the feed passage 36. The successively more remote ports $P_3$, $P_2$ and $P_1$, respectively, would have emitted progressively lesser and lesser quantities of the lubricating fluid, with port $P_1$ emitting the least quantity.

In the prior art gravity feed systems, as well as the system depicted herein, the lubricating fluid 32 may be delivered to the feed passage 36 by a collecting assembly which utilizes the natural splashing of the lubricating fluid 32 within the enclosure 17. For example, a baffle 40 may be mounted to the casing 14 above the entry, or upstream, end portion 38 of the feed passage 36. The baffle 40 extends laterally along a shelf 42 which, in combination with the baffle 40, forms a trough that is designated generally by the numeral 44. The trough 44 is inclined to direct the lubricating fluid 32 collected thereby into a funnel 46 which conducts the fluid 32 into a reservoir 48. The trough 44, the funnel 46 and the reservoir 48 are collectively identified as the collecting assembly 50. As depicted, the funnel 46 and reservoir 48 may be formed as a one piece unit by virtue of an appropriately configured plate 52 that may be secured, as by a plurality of bolts 54, to a rib 56 presented from the cover 16. A spout 58 extends outwardly from the reservoir 48 to deliver the lubricating fluid 32 collected by the reservoir 48 into the feed passage 36.

In order to assure that comparable quantities of lubricating fluid will be emitted through the ports $P_1$–$P_4$, a device 10 embodying the concepts of the present invention may be insertably received within the open end portion 38 of the feed passage 36.

Figure 4:
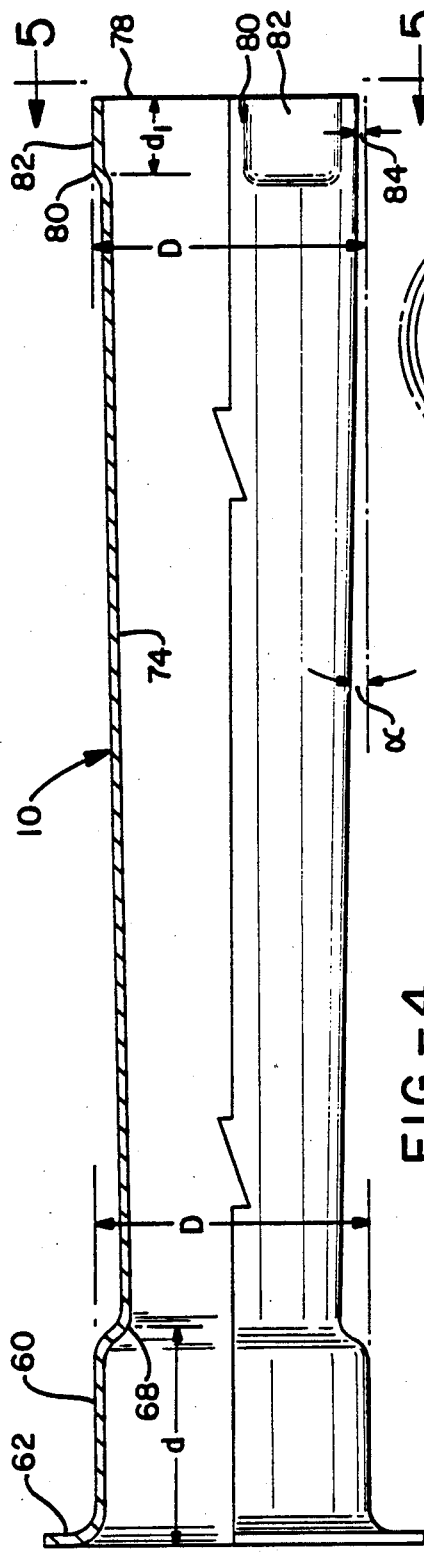
FIG. 4 is a side elevational view, partially in section, of the device depicted in FIGS. 1-3.

As may, perhaps, best be seen from FIGS. 2 and 4, the device 10 has an annular plug portion 60 which thereby defines a central passage 61. The annular plug portion 60 also has an external diameter that is virtually identical with the internal diameter "D" of the feed passage 36. As such, the plug portion 60 may be frictionally secured within the open, entry portion 38 of the feed passage 36. A locating flange 62 extends radially outwardly from one end of the plug portion 60 to engage the transverse end wall 64 of the shaft 20 and thereby determine the extent to which the device 10 may be inserted into the feed passage 36. As depicted, the plug portion 60 extends inwardly along the feed passage 36 for an axial extent "d".

Because the outer diameter of the plug portion 60 is substantially equal to the internal diameter "D" of the feed passage 36, the plug portion 60 may be force-fit into the open, entry portion 38 of the feed passage 36. The distance "d" is selected to assure not only that the device 10 will be retained within the feed passage 36 during operation of the transmission 12, but also that the plug portion 60 effects a sealing engagement with the interior wall 66 of the feed passage 36. In the typical installation more fully hereinafter described, the distance "d" might well be on the order of approximately six millimeters when the device is installed within a feed passage 36 having a diameter of approximately 13 mm.

That end of the plug portion 60 opposite the locating flange 62 is, in the representative device 10 depicted, necked down to an annular constriction 68 which is disposed concentrically outwardly of the spout 58. It is important to the operation of the device 10 that the constriction 68 be located upstream from the discharge orifice 70 at the end of the spout 58, as will be more fully hereinafter explained. As depicted, the constriction 68 delineates the smallest internal diameter of the device 10. It should be understood that constriction 68 constitutes the smallest internal diameter of the device 10 because the device 10 may be fabricated from sheet metal, thin-walled plastic, or the like. Were a thicker metal employed, the passage 61 through the plug portion 60 might well equal the inner most diameter of the constriction 68. In any event, because the device 10 rotates with the shaft 20, and because the spout 58 is fixedly positioned with respect to the cover 16, the concentricity of the constriction 68 relative to the spout 58 allows for a modest clearance 72 between the spout 58 and the constriction 68.

The device 10 also includes a flared portion 74 which tapers conically outwardly from the constriction 68 and extends for an axial distance sufficient to underlie those discharge ports which would emit the greatest quantities of the lubricating fluid 32 were the device 10 not employed. As such, in the exemplary environment depicted, the flared portion 74 extends a sufficient distance to underlie ports $P_4$ and $P_3$, as shown in FIGS. 1 and 2. Typically, the flared portion would be tapered at an angle alpha, as best seen from FIG. 4, which is selected to impart at least a modest axial force to the lubricating fluid 32 coming in contact with the rotating flared portion 74. Because of the direction, and angularity, of the taper applied to the flared portion 74 the axial force applied to the fluid 32 will urge it to flow toward the blind end wall 76 of the bore which constitutes the feed passage 36, and yet the angularity of the taper should not be so great that the axial flow imparted to the fluid 32 would preclude back-flow at the intersection of the downstream, terminal end portion 78 on the device 10 with the interior wall 66 of the feed passage 36.

Further to clarify the afore-stated, primary consideration as to the magnitude of the angle alpha at which the flared portion 74 is tapered, it should be understood that the terminal end portion 78 of the device 10 presents a radially outwardly directed spacer flange 80 that is annularly discontinuous. The radially outer, contact surface 82 on the spacer flange 80 engages the interior wall 66 of the feed passage 36 along an axial distance designated $d_1$ on the drawings. The annular discontinuity provides a plurality of back-flow apertures 84 which extend circumferentially along each discontinuity in the spacer flange 80. The back-flow apertures 84 also extend radially between the terminal end portion 78 of the flared portion 74 and the interior wall 66 of the feed passage 36.

Figure 6:
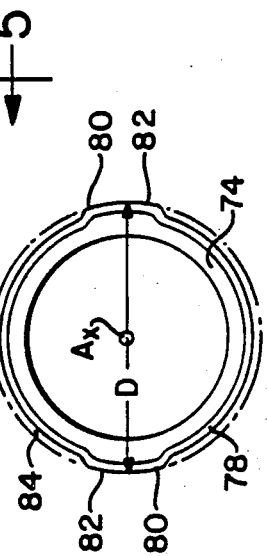
FIG. 6 is an end elevational view, similar to FIG. 5, but depicting an alternative structural arrangement for the terminal end portion of the device.
Figure 7:
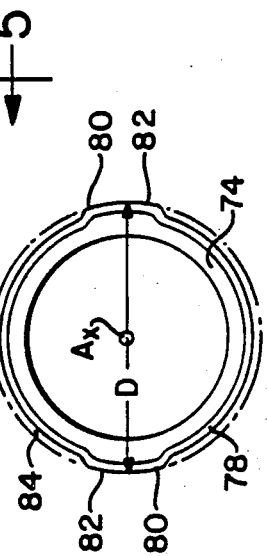
FIG. 7 is also an end elevational view, similar to FIGS. 5 and 6, but depicting a second alternative structural arrangement for the terminal end portion of the device.

FIGS. 3 and 4 depict three discontinuities which provide three back-flow apertures 84. That alternative configuration depicted in FIG. 6, depicts two discontinuities which provide two back-flow apertures 84. Similarly, the second alternative configuration depicted in FIG. 7 depicts four discontinuities which provide a concomitant number of back-flow apertures 84.

Figure 5:
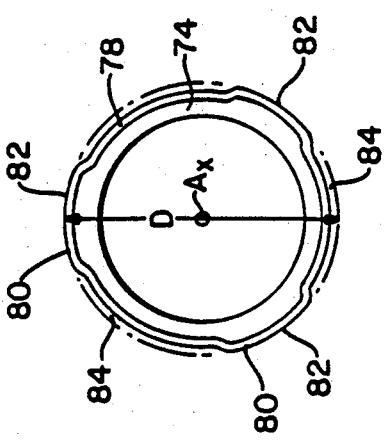
FIG. 5 is an end elevational view, taken substantially along line 5—5 of FIG. 4 and depicting the terminal end portion of the device.

In a typical installation the feed passage 36 might well, as previously noted, have an internal diameter of about 13 mm, and the spacer flange 80 might extend axially about three millimeters and radially outwardly about four-tenths millimeters from the terminal end portion 78. In the embodiment depicted in FIGS. 3 and 5, wherein three discontinuities are utilized, the contact surface 82 would extend circumferentially for approximately three millimeters. With a device 10 having an overall length of approximately 64 mm in order to underlie the discharge ports $P_4$ and $P_3$ an angle alpha of about one degree could suffice to impart the desired axial impetus to the fluid 32 engaging the flared portion 74 of the device 10 rotating with the shaft 20. It would be expected that an angle of less than five degrees would generally suffice.

The axial force applied as the rotating shaft 20 forces the fluid 32 centrifugally outward against, and along, the flared portion 74 causes at least a portion of the fluid 32 to flow toward the blind end wall 76. The volume of fluid 32 flowing toward the blind, end wall 76 which is not emitted through discharge ports $P_1$ and $P_2$ would back-flow along the interior wall 66 of the feed passage 36 to merge, and pass through the back-flow apertures 84 with a portion of the fluid 32 which is forced radially outwardly from the terminal end portion 78 of the deice 10 to strike the interior wall 66 of the feed passage 36. The fluid 32 thus passing through the back-flow apertures 84 enters the conically expanding chamber 86 between the flared portion 74 of the device 10 and the interior wall 66 of the feed passage 36 to be ejected outwardly through the discharge ports $P_3$ and $P_4$. Arrows have been included in FIG. 2 in order to show the general path along which the lubricating fluid 32 flows from the collecting assembly 40, and along the intervening structure, until the fluid 32 exits through the discharge ports $P_1$-$P_4$.

It will be appreciated from the foregoing description that the device 10 is advantageous in distributing lubricating fluid 32 which flows in the downstream direction as well as in the upstream direction. For example, when lubricating fluid 32 is admitted by a gravity system into the feed passage 36, it contacts the flared portion 74 of the device 10 at a position where the slope is downwardly toward the downstream end wall 76 of the feed passage 36, and that contact assists with downstream flow of the lubricating fluid 32. However, when fluid back-flows through the apertures 84 into the chamber 86, the same, conical slope allows the chamber 86 to expand toward the upstream end of the passage 36, and that configuration also facilitates the flow of lubricating fluid 32 into the chamber 86. Thus, the slope facilitates flow of the fluid 32 in both the downstream and the upstream directions.

It should also be appreciated that when the shaft is not rotating—i.e.: when the apparatus in which the device 10 is incorporated is "shut down"—the sealing effect between the device 10 and the feed passage 36 at the upstream end of the feed passage 36 will, in most situations, effectively trap a certain amount of lubricating fluid within the feed passage 36. The retained fluid 32 is, of course, beneficial at start-up to provide an initial quantity of lubricating fluid 32 at the upstream and downstream ends of the feed passage 36 in order to permit rather rapid emission of fluid outwardly through the discharge ports $P_1$-$P_4$.

It will recognized by those knowledgeable in this art that the device 10 may be made from various metals and/or plastic materials which are compatible with the selected lubricating fluid and the particular environment involved. Therefore, the invention is not limited by the type of material used for the device 10.

While certain representative embodiments have been shown for the purpose of illustrating the invention, it will be apparent to those skilled in this art that various changes and modifications may be made therein without departing from the spirit or scope of the invention. As should now also be apparent, the present invention not only teaches that a device embodying the concepts of the present invention enhances the radial distribution of lubricating fluid from a plurality of axially spaced discharge ports in a rotating shaft but also that the other objects of the invention are likewise accomplished.

The embodiments of this invention in which an exclusive property or privilege is claimed are defined as follows:

1. A device for assisting with the radial distribution of a fluid from a rotating shaft having an axially oriented blind bore opening through one end of the shaft and a plurality of discharge ports opening radially outwardly through the shaft, the discharge ports spaced axially along the blind bore to effect communication between the blind bore and the exterior of the shaft, said device comprising: means provided on the device to retain the device for rotation with said rotating shaft within the axially oriented blind bore with said device overlying at least one of said discharge ports; a constriction presented from the device; said constriction located interiorly of the axially oriented blind bore when the device is received within the bore; a flared portion tapering axially outwardly from said constriction and extending inwardly along the blind bore to a terminal end portion; a spacer flange extending radially outwardly from said terminal end portion to engage the axially oriented blind bore; and, said spacer flange being circumferentially discontinuous for permitting controlled fluid distribution to said discharge ports overlain by said device.

2. A device, as set forth in claim 1, wherein said means to retain the device within the axially oriented blind bore comprises: a plug portion having opposite axial ends, said plug portion adapted to be frictionally received within the axially oriented, blind bore; and, said constriction presented from that axial end of said plug portion located interiorly of the axially oriented blind bore.

3. A device, as set forth in claim 2, further comprising: a locating flange extending radially outwardly from that end of said plug portion opposite the end at which said constriction is located.

4. A device, as set forth in claim 3, wherein: said constriction is annular.

5. A device, as set forth in claim 4, wherein: said flared portion tapers at less than five degrees.

6. A lubrication system for an enclosure containing a lubricating fluid and at least one rotating shaft having at least one transverse end, said system comprising: means to splash the lubricating fluid within the enclosure; a blind bore extending axially through said transverse end wall of the rotating shaft; a plurality of radially oriented discharge ports located axially, and circumferentially, along the rotating shaft to communicate between the blind bore and the exterior of the shaft; means within the enclosure to collect splashed lubricating fluid and feed it by gravity through a spout; a device insertably received within said blind bore at a location overlying at least half of the plurality of discharge ports; means provided on said to retain said device for rotation with said shaft within said blind bore; a constriction presented from said device; said constriction located interiorly of said blind bore when said device is received within the blind bore; a flared portion tapering axially outwardly from said constriction and extending inwardly along said blind bore to a terminal end portion and being spaced from and converging with the blind bore to provide a fluid passage therebetween; said spout delivering the lubricating fluid axially beyond said constriction to said flared portion; a spacer flange extending radially outwardly from said terminal end portion to engage the axially oriented blind bore; and, said spacer flange being circumferentially discontinuous for permitting controlled fluid distribution to said fluid passage.

7. A vehicular transmission including a radial lubricating distribution system and comprising: means to splash the lubricating fluid within the transmission; at least one rotating shaft in the transmission, said shaft having a transverse end; a feed passage in the nature of a blind bore extending axially through said transverse end wall of said rotating shaft; a plurality of radially oriented discharge ports located axially, and circumferentially, along said feed passage to communicate with the exterior of said shaft; a collector means within the transmission to collect splashed lubricating fluid and feed it outwardly through a spout means; a device insertably received within said feed passage sufficient to overlay at least one discharge port; means provided on said device to retain said device within said feed passage for rotation with said shaft; a constriction presented from said device; said constriction located interiorly of said blind bore when said device is received within said feed passage; a flared portion tapering axially outwardly from said constriction and extending inwardly along said feed passage in converging relation therewith to terminate in a terminal end portion; said spout means delivering the lubricating fluid to engage said flared portion; a spacer flange extending radially outwardly from said terminal end portion to engage said feed portion; and, said spacer flange being circumferentially discontinuous for permitting controlled fluid flow to said overlain discharge port.

8. A device, as set forth in claim 7, wherein: said flared portion tapers at less than five degrees.

9. A device, as set forth in claim 7, wherein said means to retain the device within the axially oriented blind bore comprises: a plug portion having opposite axial ends adapted to be frictionally received within the axially oriented, blind bore; and, said constriction presented from that axial end of said plug portion located interiorly of the axially oriented blind bore.

10. A device, as set forth in claim 9, further comprising: a locating flange extending radially outwardly from that end of said plug portion opposite the end at which said constriction is located.

11. A device, as set forth in claim 10, wherein: said constriction is annular.

* * * * *